US012539518B2

(12) United States Patent
Rizzoli

(10) Patent No.: US 12,539,518 B2
(45) Date of Patent: Feb. 3, 2026

(54) SYSTEM FOR A VERTICAL GRINDING MILL, A REPLACEMENT KIT OF WEAR SEGMENTS, A KIT OF WEAR PROTECTION ELEMENTS AND A VERTICAL GRINDING MILL

(71) Applicant: Metso Finland Oy, Espoo (FI)

(72) Inventor: Rodrigo Rizzoli, São Paulo (BR)

(73) Assignee: METSO FINLAND OY, Espoo (FI)

( * ) Notice: Subject to any disclaimer, the term of this patent is extended or adjusted under 35 U.S.C. 154(b) by 185 days.

(21) Appl. No.: 18/036,499

(22) PCT Filed: Oct. 7, 2021

(86) PCT No.: PCT/EP2021/077647
§ 371 (c)(1),
(2) Date: May 11, 2023

(87) PCT Pub. No.: WO2022/128195
PCT Pub. Date: Jun. 23, 2022

(65) Prior Publication Data

US 2023/0415164 A1 Dec. 28, 2023

(30) Foreign Application Priority Data

Dec. 17, 2020 (SE) .................................... 2051483-2

(51) Int. Cl.
*B02C 17/10* (2006.01)
*B02C 17/16* (2006.01)

(52) U.S. Cl.
CPC ........ *B02C 17/163* (2013.01); *B02C 2210/02* (2013.01)

(58) Field of Classification Search
CPC ... B02C 17/163; B02C 17/10; B02C 2210/02; B01F 27/052
See application file for complete search history.

(56) References Cited

U.S. PATENT DOCUMENTS 3,469,824 A 9/1969 Futty et al.
4,660,776 A 4/1987 Ikebuchi et al.
(Continued)

FOREIGN PATENT DOCUMENTS

CL 59101 11/2017
CL 202301496 5/2023
(Continued)

OTHER PUBLICATIONS

English translate (CN110523481A), retrieved date Apr. 1031, 2025.*
(Continued)

*Primary Examiner* — Mohammed S. Alawadi
(74) *Attorney, Agent, or Firm* — Andrus Intellectual Property Law, LLP

(57) ABSTRACT

A system for a vertical grinding mill. The system includes a longitudinally extending shaft supporting a helical screw flight and at least one adaptor plate configured to be fixedly mounted to the shaft. Each adaptor plate includes at least one first locking member. The system further includes at least one wear segment configured to be supported by the at least one first locking member. Further, a replacement kit, a kit of wear protection elements and a vertical grinding mill is provided.

14 Claims, 10 Drawing Sheets

(56) References Cited

U.S. PATENT DOCUMENTS

| | | | | |
|---|---|---|---|---|
| 2016/0144373 | A1 | 5/2016 | Haas et al. | |
| 2019/0060910 | A1 | 2/2019 | Grozdanich | |
| 2020/0391219 | A1* | 12/2020 | Faulkner | A01F 29/00 |

FOREIGN PATENT DOCUMENTS

| | | | |
|---|---|---|---|
| CN | 204803952 | U | * 11/2015 |
| CN | 107206388 | A | 9/2017 |
| CN | 206642869 | U | 11/2017 |
| CN | 108499665 | A | 9/2018 |
| CN | 110523481 | A | * 12/2019 |
| CN | 110893370 | A | 3/2020 |
| CN | 210207075 | U | 3/2020 |
| CN | 217069107 | U | 7/2022 |
| JP | 2019209316 | A | 12/2019 |
| WO | 2007070929 | A1 | 6/2007 |
| WO | 2016079574 | A1 | 5/2016 |
| WO | 2022128725 | A1 | 6/2022 |

OTHER PUBLICATIONS

English translate (CN204803952U), retrieved date Apr. 1031, 2025.*

International Search Report and Written Opinion for PCT/EP2021/077647, mailed Jan. 12, 2022.

International Preliminary Report on Patentability for PCT/EP2021/077647, mailed Mar. 16, 2023.

Office Action for Swedish Application No. 2051483-2, dated May 11, 2021.

Search Report for Chinese Patent Application No. 2021112482630, issued Aug. 16, 2024.

Office Action for Chinese Patent Application No. 2021112482630, issued Aug. 16, 2024.

Examiner's Report and Search Report for Chilean Application No. 202301497, dated Oct. 16, 2024.

Search Report and Examination Report for Chinese Patent Application No. 202111248263.0, dated Mar. 7, 2025.

* cited by examiner

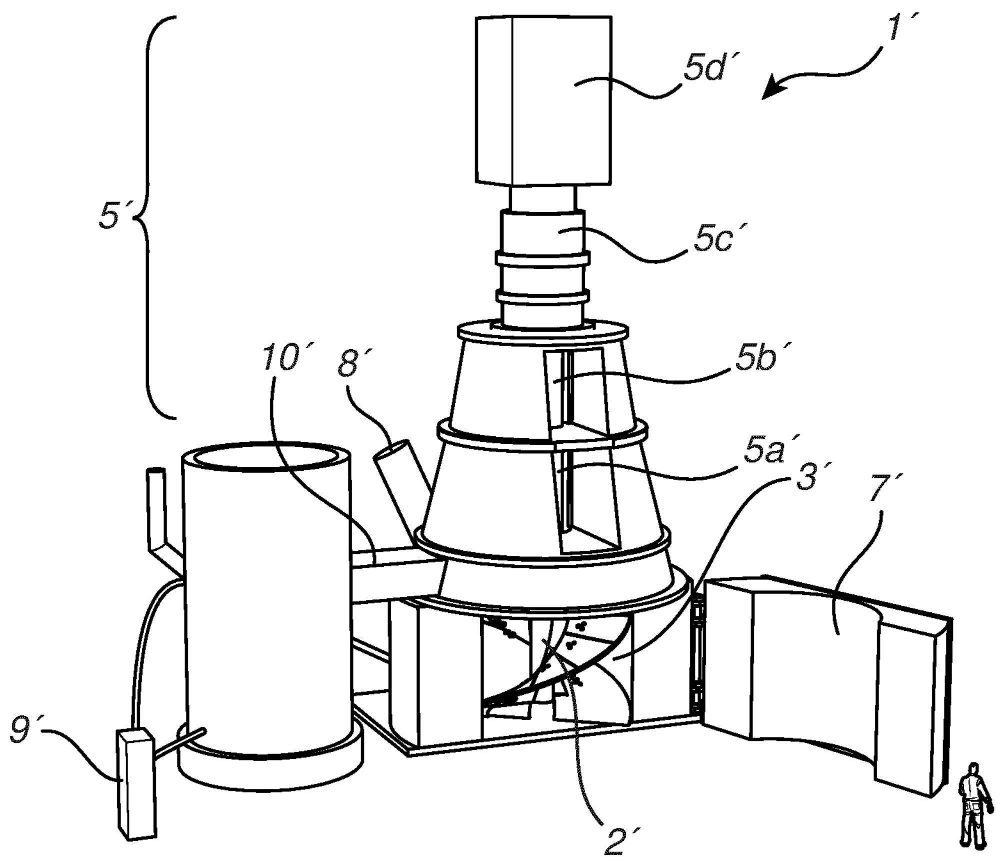
(Prior art) Fig. 1a
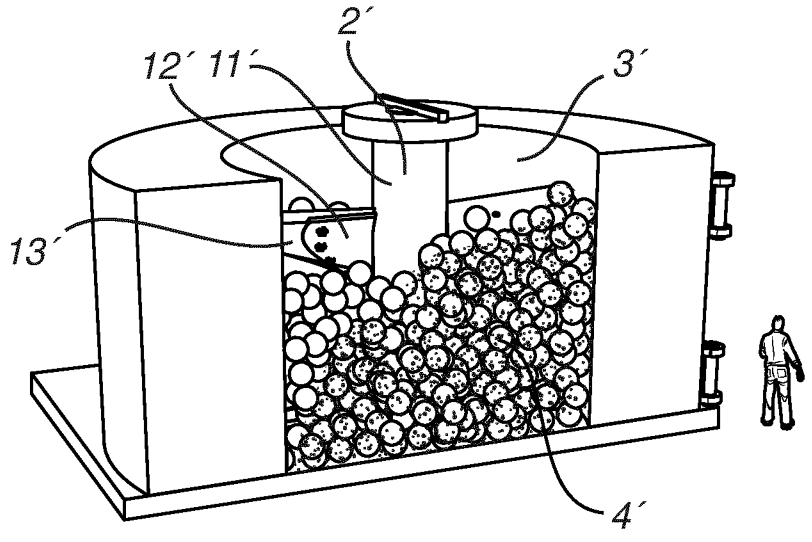
(Prior art) Fig. 1b

SYSTEM FOR A VERTICAL GRINDING MILL, A REPLACEMENT KIT OF WEAR SEGMENTS, A KIT OF WEAR PROTECTION ELEMENTS AND A VERTICAL GRINDING MILL

CROSS-REFERENCE TO RELATED APPLICATIONS

This application is the U.S. national stage application of International Application PCT/EP2021/077647, filed Oct. 7, 2021, which international application was published on Jun. 23, 2022, as International Publication WO 2022/128195 A1 in the English language. The International Application claims priority Swedish Patent Application No. 2051483-2 filed Dec. 17, 2020.

FIELD OF THE INVENTION

The present disclosure relates to a system for a vertical grinding mill, a replacement kit of wear segments for a longitudinally extending shaft supporting a helical screw flight, a kit of wear protection elements for a longitudinally extending shaft supporting a helical screw flight and also a vertical grinding mill.

BACKGROUND

Vertical grinding mills are known, e.g., from U.S. Pat. No. 4,660,776 and from the brochure "VERTIMILL™-Fine and ultrafine wet grinding". A vertical grinding mill has a chamber in which an agitator is arranged. Grinding media, which may be made of e.g. steel or ceramics and which may have different shapes, such as balls or natural pebbles, is provided in the chamber. Water, the material to be ground, and optionally additives are fed into the chamber. By rotating the agitator, the charge is agitated, such that the grinding media grinds the material to be ground by abrasion and attrition. The two references mentioned above disclose vertically arranged stirred mills. However, the same general principle is used in stirred mills with e.g. tilted arrangements.

The chamber retains the grinding media and, in case of a vertically arranged mill, the chamber also supports the drive components including the agitator.

The agitator which rotates and imparts motion to the grinding media consists, in the VERTIMILL™, of an inner welded screw flight system that supports a number of outer wear liners, which are bolted onto the welded screw flight system. The welded screw flight system according to this prior art is composed of a shaft, and a number of screw flights, which are welded onto the shaft to form a continuous helical blade longitudinal of the shaft. Whereas the welded screw flight system may be protected from wear by means of the outer wear liners which may be replaced as spare parts, the shaft is typically protected by protective coating. This coating is cumbersome to maintain and replace if necessary since coatings require a substantive and careful surface treatment which requires a costly down-time. There is hence a need for an alternative solution of facilitating maintenance of the agitator.

SUMMARY

An object of the disclosure is to provide a system for vertical grinding mills which may be applied both to new agitators, but which also may be applied as a retro-fit to existing agitators on the field.

Another object of the disclosure is to provide a system which requires a low down-time.

Another object of the disclosure is to provide a kit of parts which may be provided as spare parts to the disclosed system. but also for retro-fitting to already existing agitators.

According to a first aspect of the disclosure, these and other objects are achieved, in full or at least in part, by a system for a vertical grinding mill, the system comprising

- a longitudinally extending shaft supporting a helical screw flight,
- at least one adaptor plate configured to be fixedly mounted to the shaft, each adaptor plate comprising at least one first locking member, and
- at least one wear segment configured to be supported by the at least one first locking member.

Accordingly, a system is provided which comprises at least one adaptor plate which is configured to be fixedly mounted to the shaft and thereby form part of a permanent installation, whereas the at least one wear segment is configured to be supported by the at least one adaptor plate via at least one locking member. Thereby, the at least one wear segment may be considered as a consumable part which may be removed and replaced by a new when worn down. The provision of removable wear segments allows the downtime for maintenance to be substantially shortened. This in turn allows an overall improved production economy. The system may be provided to new screws in new agitator installations, but it may also be installed as a retro-fit to existing agitator installations.

The at least one adaptor plate may be configured to be fixedly mounted to the shaft in an interspace between two longitudinally aligned portions of the helical screw flight.

The adaptor plate will thereby act as a protecting shield which closely abuts the exterior surface of the shaft, i.e. the surface to be protected by the system. The longitudinal extension of the adaptor plate, i.e. the height when installed on a vertical screw, preferably corresponds to the pitch of the helical screw flight. The fixation of the adaptor plate to the shaft may be made by e.g. welding. By using welding, there are no protruding parts which are subjected to wear and in the long run requiring maintenance or replacement.

The at least one wear segment may comprise a second locking member having a geometry complementary to the at least one first locking member, and wherein the at least one first and second locking members may be configured to lockingly engage each other by a sliding movement.

By the sliding movement, the gravity may be used to facilitate the mounting operation by providing an automatic aligning between the wear segment and the adaptor plate, but also to maintain a locking engagement between the wear segments and the adaptor plates during operation of the agitator.

The at least one wear segment may be configured to be fastened to the at least one adaptor plate. The fastening may be made by bolting the at least one wear segment to the at least one adaptor plate. To accommodate and protect the bolt head from wear, the at least one wear segment may be provided with a partially recessed bolt hole. Additionally, or as an alternative, the exterior envelope surface of the wear segment configured to face away from the adaptor plate may be provided with a protective wall portion. The protective wall portion must not have a circumferential extension as such, but it is sufficient that such protective wall portion has an extension facing the leading edge of the helical screw flight as seen during rotation of the agitator. As the agitator rotates during use, the material to be ground and the grinding media inside the chamber will first hit the protective wall before reaching the bolt head.

The at least two wear segments may be configured to be arranged one after the other as seen along the longitudinal extension of the shaft in an abutting relationship and/or in a partly overlapping relationship. Thereby, the at least two wear segments may form a longitudinally extending sealed wear surface along the shaft.

The plurality of wear segments may be configured to be installed along substantially the full longitudinal extension of the helical screw flight. The plurality of wear segments will accordingly form a helically extending pattern of wear segments arranged one after the other along the portion of the shaft that during operation of the agitator is in contact with the grinding media and the material to be ground.

The at least one adaptor plate may be configured to be fixedly mounted to the shaft by welding. The welding may be made along the perimeter of the adaptor plate. To further improve strength, the welding may be made along the perimeter of one or more through-going optional holes in the envelope surface of the adaptor plate.

The at least one wear segment may, on an exterior envelope surface thereof which is configured to face away from the shaft, comprise undulations. The undulations may have an extension substantially coinciding with the main moving direction of the material to be ground in the chamber of the vertical grinding mill. The undulations may have an extension coinciding with the longitudinal extension of the shaft as seen in a condition when the at least one wear segment is mounted thereto. The undulations serve as wear material, i.e. material to be abraded during operation to thereby increase the operational life length of the wear segments. By providing the wear material in the form of undulations having a locally increased thickness of material, the overall weight of the individual wear segment may be decreased as compared to providing the individual wear segment with an increased uniform thickness of material.

The at least one wear segment may, on an exterior envelope surface thereof which is configured to face away from the shaft, comprise at least one lifting lug. The at least one lifting lug may be used to facilitate handling of the wear segment during the act of mounting the wear segment to the adaptor plate. The at least one lifting lug may be formed unitary with the at least one wear segment. In an alternative solution, the at least one lifting lug may be provided as a separate lifting lug removably attached thereto.

The at least one wear segment may comprise at least one eyelet configured to receive a lifting strap. The at least one eyelet may be embodied as a throughgoing channel which allows insertion of a strap to facilitate removal of the at least one wear segment during maintenance or replacement. The eyelet preferably has a longitudinal extension between its two openings, one forming an inlet and one forming an outlet, which is different from the thickness direction of the wear segment. One of the two openings may by way of example be arranged on the exterior envelope surface of the wear segment facing away from the shaft whereas the other opening may be arranged on an edge portion of the wear segment. The eyelet may be arranged in a portion of the wear segment which has a locally increased thickness of material. Thereby, the eyelet will remain unaffected also when the wear segment has been worn to such extent that it is ready to be removed by using a strap extending though the eyelet.

The at least one first locking member may be a wedge, and the at least one second locking member may be a recess, whereby the first and second locking members are configured to interlock by a sliding movement.

The wedge serves the dual purpose of providing a guiding effect during mounting of the wear segment to the adaptor plate and providing a frictional self-locking effect between the wear segment and the adaptor plate.

The first and second locking members may have a longitudinal extension configured to coincide with the longitudinal extension of the shaft, i.e. a vertical extension as seen in a vertical grinding mill. The first locking member may have a gradually increasing thickness as seen in a direction from an insertion end to an opposing stopping end. Further, the width of the insertion end may be smaller than the width of the opposing stopping end.

It is to be understood that the same principle is equally applicable in the event the at least one first locking member is a recess, and the at least one second locking member is a wedge.

The system may further comprise an end-cap configured to be mounted to a lower most free end of the shaft.

The end-cap is configured to serve as a wear protection of the free end of the shaft. The end-cap may be formed as a unitary body with a bottom wall having an extension transverse to the longitudinal extension of the shaft and at least one wall portion configured to longitudinally abut a lower most longitudinally extending side wall portion of the shaft.

In an alternative embodiment, the end-cap is divided into at least two parts to be interconnected e.g. by bolting. One of the at least two parts may be a bottom wall having an extension transverse to the longitudinal extension of the shaft and another of the at least two parts may be a wall portion configured to longitudinally abut a lower most longitudinally extending side wall portion of the shaft.

No matter design, the end-cap should be made of a wear resistant material. The material may be of the same type as that used for the wear segments.

According to a second aspect of the disclosure, these and other objects are also achieved, in full or at least in part, by a replacement kit of wear segments for a longitudinally extending shaft supporting a helical screw flight, the replacement kit comprising at least two wear segments configured to be directly or indirectly supported by the shaft, wherein the at least two wear segments are configured to be arranged one after the other as seen along the longitudinal extension of the shaft in an abutting relationship and/or in a partly overlapping relationship.

Accordingly, the replacement kit comprises spare parts to be used during maintenance of the system for a vertical grinding mill, which system has been discussed above. The advantages and design of the at least two wear segments, and the system as such, have been discussed above and to avoid undue repetition, reference is made to the previous discussion. It is to be understood that depending on the design of the shaft, the at least two wear segments may be arranged either directly or indirectly to the shaft. In the event of an indirect arrangement, the at last two wear segments may be configured to be mounted to adaptor plates supported by the shaft. In the event of a direct arrangement, the at last two wear segments may be configured to be mounted directly to the shaft, i.e. by omitting any adaptor plates. Such mounting may be made by e.g. bolting or complementary locking members on the shaft and the wear segments respectively.

Each of the at least two wear segments in the replacement kit may comprise at least one of:

- a locking member having a geometry complementary to a locking member arranged directly or indirectly on the shaft;

undulations arranged on an exterior envelope surface configured to face away from the shaft;

at least one lifting lug; and at least one eyelet configured to receive a lifting strap; and wherein the replacement kit further may comprise an end-cap or a liner thereof configured to be mounted to a lower most free end of the shaft.

The advantages and design of the at least two wear segments and the end-cap have been discussed above and to avoid undue repetition, reference is made to the previous discussion.

According to a second aspect of the disclosure, these and other objects are also achieved, in full or at least in part, by a kit of wear protection elements for a longitudinally extending shaft supporting a helical screw flight, the kit comprising:

at least two adaptor plates being configured to be fixedly mounted to the shaft; and at least two wear segments configured to be mounted to the adaptor plates one after the other as seen along the longitudinal extension of the shaft in an abutting relationship or in a partly overlapping relationship; and wherein the at least two wear segments and the at least two adaptor plates comprise complementary locking members.

Accordingly, the kit comprises wear protection elements allowing a shaft of an agitator of a vertical grinding mill to be provided with a wear system no matter if it is an installation of a brand-new shaft or a retro-fit on an existing shaft. The advantages and design of the at least two wear segments and the at least two adaptor plates have been discussed above and to avoid undue repetition, reference is made to the previous discussion.

The kit may further comprise an end-cap configured to be mounted to a lower most free end of the shaft. The advantages and design of the end-cap have been discussed above and to avoid undue repetition, reference is made to the previous discussion.

According to yet another aspect, a vertical grinding mill is provided. The vertical grinding mill comprises a longitudinally extending shaft supporting a helical screw flight, at least one adaptor plate configured to be fixedly mounted to the shaft, each adaptor plate comprising at least one first locking member, and at least one wear segment configured to be supported by the at least one first locking member.

The advantages and design of a shaft supporting a screw with a helical screw flight provided with at least one adaptor plate with at least one locking member and at least one wear segment supported thereby has been thoroughly described above. To avoid undue repetition, reference is made to the previous discussion.

Other objectives, features and advantages of the present disclosure will appear from the following detailed disclosure, from the attached claims, as well as from the drawings. It is noted that the disclosure relates to all possible combinations of features.

Generally, all terms used in the claims are to be interpreted according to their ordinary meaning in the technical field, unless explicitly defined otherwise herein. All references to "a/an/the [element, device, component, means, step, etc.]" are to be interpreted openly as referring to at least one instance of said element, device, component, means, step, etc., unless explicitly stated otherwise. The steps of any method disclosed herein do not have to be performed in the exact order disclosed, unless explicitly stated.

As used herein, the term "comprising" and variations of that term are not intended to exclude other additives, components, integers or steps.

BRIEF DESCRIPTION OF THE DRAWINGS

The disclosure will be described in more detail with reference to the appended schematic drawings, which show examples of presently preferred embodiments of the disclosure.

FIG. 1*a* is a schematic perspective view of a vertical stirred mill according to prior art.

FIG. 1*b* is a schematic cross-sectional view of a chamber of a vertical stirred mill according to prior art.

DETAILED DESCRIPTION

Figure 2:
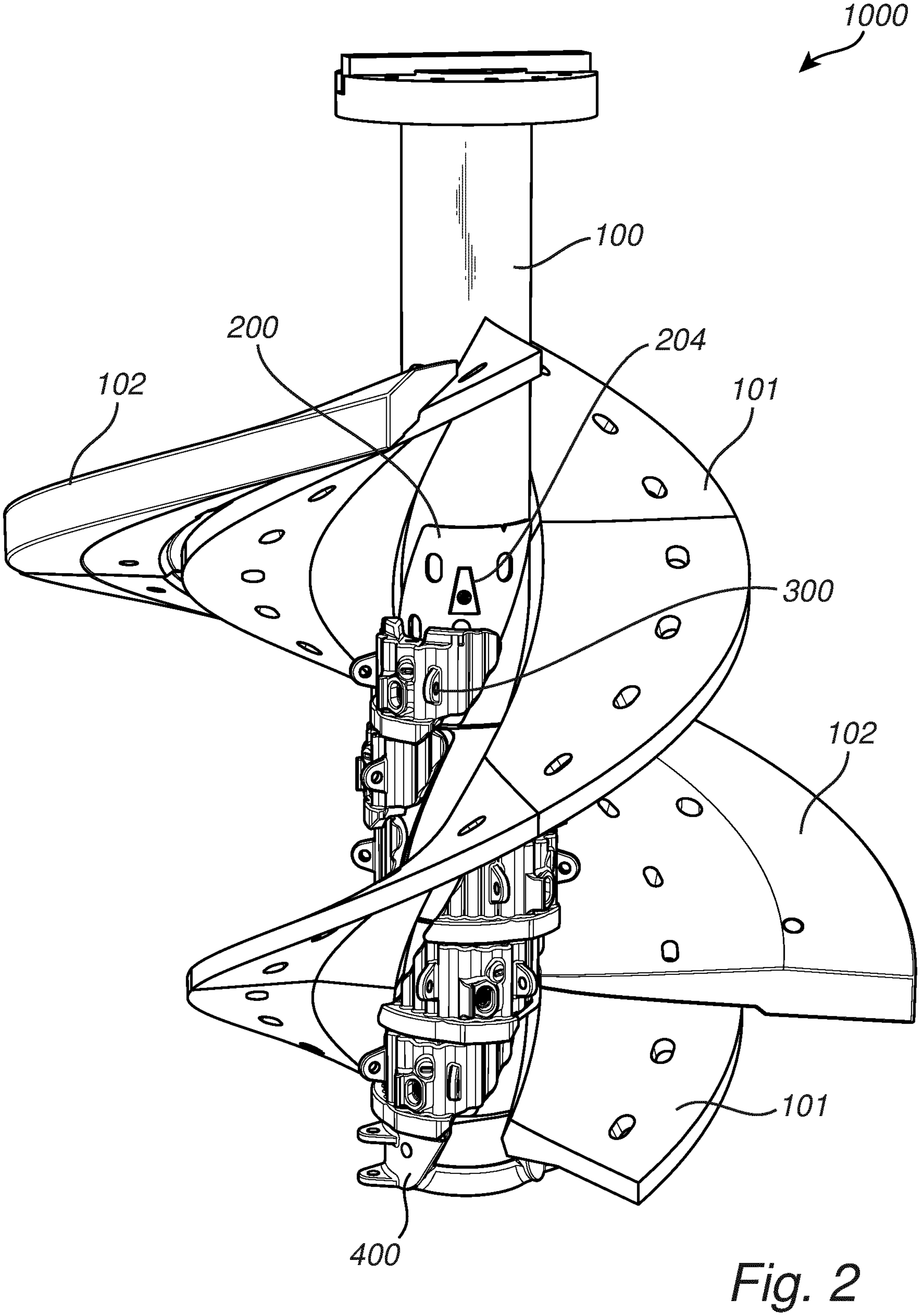
FIG. 2 is an overview of the inventive system as mounted to a shaft of an agitator.

The present disclosure will now be described more fully hereinafter with reference to the accompanying drawings, in which currently preferred embodiments of the disclosure are shown. The present disclosure may, however, be embodied in many different forms and should not be construed as limited to the embodiments set forth herein; rather, these embodiments are provided for thoroughness and completeness, and to fully convey the scope of the disclosure to the skilled addressee. Like reference characters refer to like elements throughout.

In the following description, the term "longitudinal" will be used. In the context of the disclosure this will refer to the longitudinal extension of the shaft of the agitator unless nothing else is given.

FIG. 1*a* shows a vertical grinding mill 1' according to prior art. The vertical grinding mill 1' comprises an agitator 2' arranged in a grinding chamber 3'. As shown in FIG. 1*b*, the chamber 3' is filled with grinding media 4', which may be of e.g. steel or ceramics and which may have different shapes, such as balls or natural pebbles. Slurry of water, material to be ground, and optionally additives are fed to an opening 8' at the top of the chamber 3' and the agitator 2' is rotated, thereby agitating and imparting motion to the grinding media 4', which grinds the material to be ground within the chamber 3'.

The agitator 2', comprises a central shaft 11' with a helical screw flight 12' with wear lining elements 13' arranged thereon. The helical screw flight 12' with its wear lining elements 13' provides an uprising flow along the wear lining elements 13' and the shaft 11' during agitation. A classification of particles is provided in the upper portion of the chamber 3' when particles grinded small enough rise towards the upper portion of the chamber 3' and are removed via an overflow launder 10', while the larger, heavier particles are drawn by gravity into the media in a downward flow between an outer periphery of the wear lining elements 13' of the agitator 2' and an inner wall of the chamber 3', and then re-circulated back into the uprising flow along the wear lining elements 13' and the shaft 11' to be further ground.

As shown in FIG. 1*a* and FIG. 1*b*, the chamber 3' retains the grinding media and also supports drive components 5', such as a driver shaft 5*a*', a thrust bearing 5*b*', a gear reducer 5*c*' and a motor 5*d*'.

Now turning to FIG. 2, an overview of the inventive system 1000 is disclosed. The system 1000 comprises the following components: a longitudinally extending shaft 100 supporting a helical screw flight 101 with lining elements 102; at least one adaptor plate 200 configured to be fixedly mounted to the shaft 100; and at least one wear segment 300. The system may further comprise an end-cap 400 to be mounted on the lower most free end of the shaft 100. The shaft 100 forms part of an agitator of the type that previously has been described above with reference to FIGS. 1*a* and 1*b*.

The at least one adaptor plate 200 is configured to be fixedly mounted to the shaft 100 and thereby form part of a permanent installation, whereas the at least one wear segment 300 is configured to be removably supported by the at least one adaptor plate 200 via at least one locking member 204 supported by the adaptor plate 200.

A plurality of wear segments 300 are configured to be installed along the full longitudinal extension of the helical screw flight 101. To facilitate understanding, the upper most adaptor plate 200 in FIG. 2 is disclosed without any wear segment. As a consequence of the helical screw flight 101, the plurality of wear segments 300 will form a helically extending pattern of wear segments 300 arranged one after the other. It is preferred that wear segments 300 are arranged at least along the full longitudinal extension of the helical screw flight 101 since this during operation will be in contact with the grinding media and the material to be ground and hence be subjected to wear.

The end-cap 400 which is mounted to the lower most free end of the shaft 100 is configured to serve as a wear protection of the free end of the shaft 100.

Figure 3A:
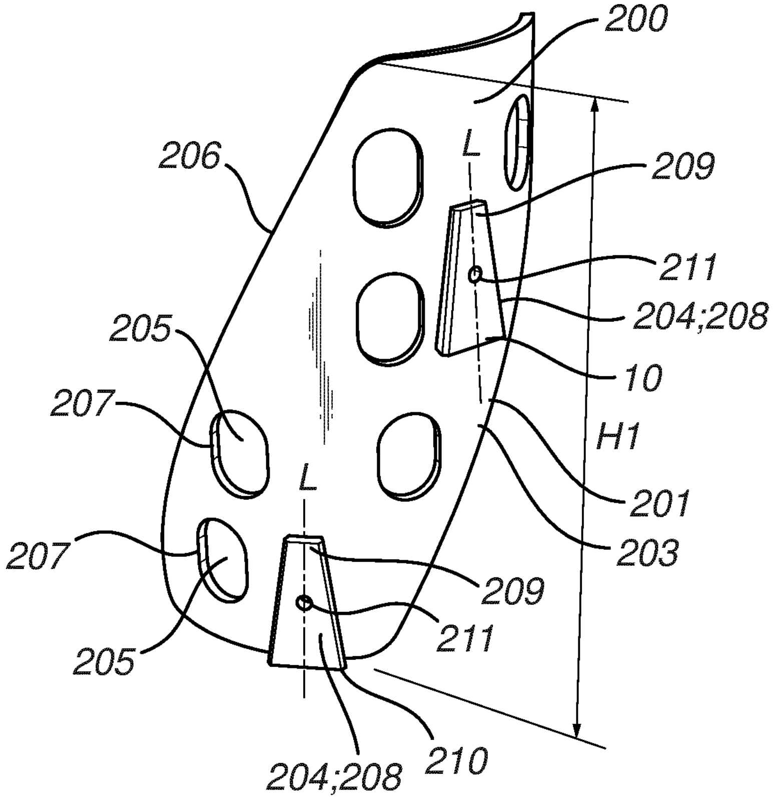
FIGS. 3*a* and 3*b* are two perspective views of an adaptor plate.
Figure 3B:
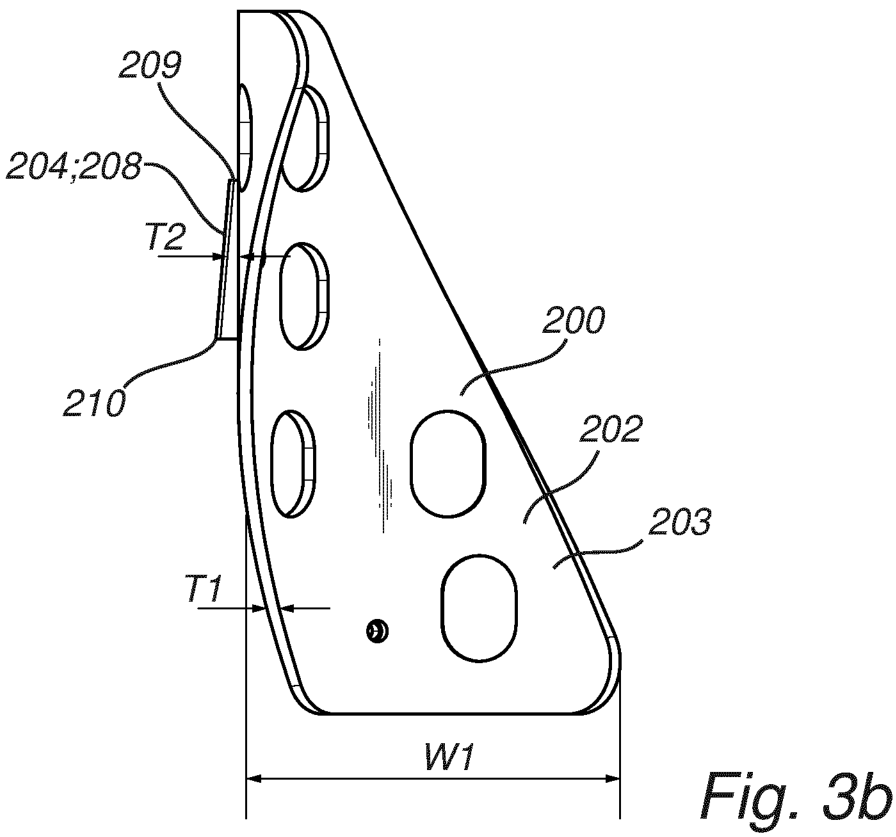

Now turning to FIGS. 3*a* and 3*b*, one embodiment of the adaptor plate 200 is disclosed. FIG. 3*a* discloses the exterior envelope surface 201 of the adaptor plate 200, i.e. the surface which during use is configured to face away from the shaft 100. Correspondingly, FIG. 3*b* discloses the interior envelope surface 202 of the adaptor plate 200, i.e. the surface which during use is configured to abut the shaft 100.

Figure 4:
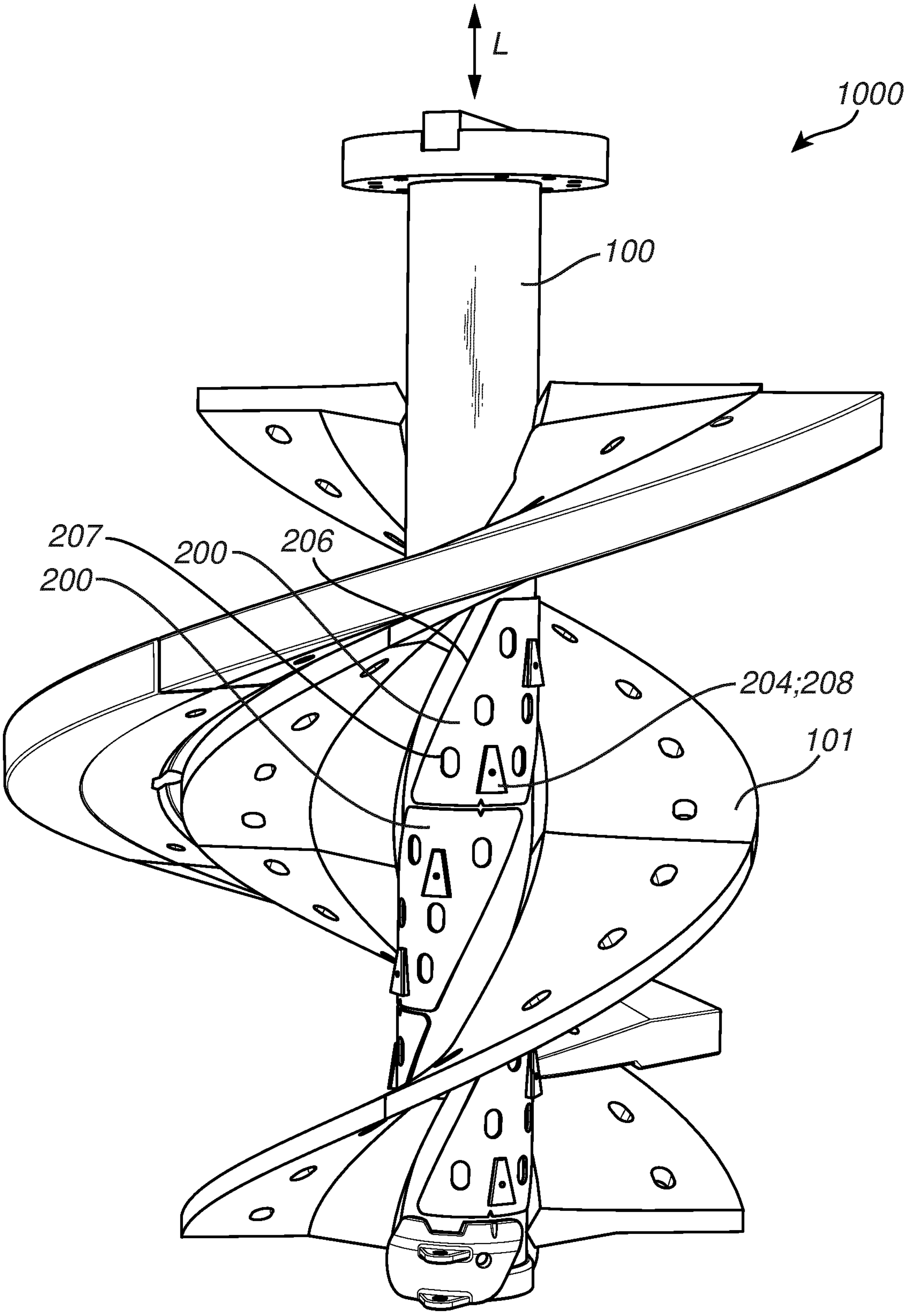
FIG. 4 is a view of a shaft supporting a plurality of adaptor plates.

The adaptor plate 200 is configured to be fixedly mounted to the shaft 100 in an interspace between two longitudinally aligned portions of the helical screw flight 101 as is best seen in FIG. 4. By being arranged between two vertically aligned portions of the helical screw flight 101, the adaptor plate 200 will act as a protecting shield which closely abuts the exterior surface of the shaft 100 and protects the same from wear.

The adaptor plate 200 comprises a single-curved body 203 having a longitudinal extension, i.e. a height H1 that corresponds to the pitch of the helical screw flight 101. Further, the adaptor plate has a width W1 that is adapted so that substantially the full circumference of the shaft 100 may be covered by adaptor plates 200 and the helical screw flight 101 in a condition when a plurality of adaptor plates 200 are arranged one after the other in an abutting relationship along the longitudinal extension L of the shaft 100, see FIG. 4. The skilled person realizes that the number of adaptor plates 200 of the system 1000 depends on the length of the shaft 100 to be covered and also the height H1 and width W1 of the individual adaptor plates 200. The single-curved body 203 may have a uniform thickness T1.

The adaptor plate 200 may be made of e.g. A36 steel, i.e. a common structural steel.

The adaptor plate 200 comprises on its exterior envelope surface 201 two locking members, in the following referred to as first locking members 204. Thus, the disclosed adaptor plate 200 is configured to support two wear segments 300. It is to be understood that each adaptor plate 200, within the scope of the invention, may be configured to support one wear segment 300 only. In such non-disclosed embodiment, the height of the adaptor plate may be half of the height H1 of the disclosed adaptor plate 200.

The body 203 of the disclosed embodiment of the adaptor plate 200 comprises a plurality of through-going holes 205. The holes 205 reduce the overall weight of the adaptor plate 200. The holes 205 may also be used during fixation of the adaptor plate 200 to the shaft 100 as will be explained below. It is to be understood that the pattern of the holes 205 may be varied and that the holes may even be omitted.

The adaptor plate 200 may be configured to be fixedly mounted to the shaft 100 by welding. The welding may be made along the perimeter 206 of the adaptor plate 200. The welding may be made in the form of a continuous or a dis-continuous bead. To further improve strength, the welding may be made along the perimeter 207 of the one or more through-going holes 205. By using welding, there are no protruding parts that may be subjected to wear and in the long run requiring maintenance or replacement. It is however to be understood that other ways of fixating the adaptor plate 200 are equally applicable, such as brazing, bolting.

Each first locking member 204 is disclosed as being formed as a wedge 208 having a truncated triangular shape. The wedge 208 is disclosed as having a longitudinal extension coinciding with the longitudinal extension L of the shaft 100 as seen in a condition when the adaptor plate 200 is mounted to the shaft 100. As will be discussed below, each first locking member 204 is configured to lockingly engage with a corresponding recess in the wear segment 300 to be supported thereby which recess constitutes a second locking member 314. The truncated end of the first locking member 204 serves as an insertion end 209 whereas the opposing lower end serves as a stopping end 210.

As is best seen in FIG. 3*b*, the first locking member 204 is provided with a gradually increasing thickness T2 as seen in a direction from the insertion end 209 to the opposing stopping end 210. As will be described below, the first locking member 204 in the form of a wedge 208 serves the dual purpose of providing a guiding effect during mounting of the wear segment 300 to the adaptor plate 200 and providing a frictional self-locking effect between the first and second locking members 204; 314 and hence between the wear segment 300 and the adaptor plate 200.

The first locking member 204 may comprise an optional hole 211. This hole 211 is configured to receive a non-disclosed bolt to extend through the first and second locking members 204; 314 in a condition when the wear segment 300 is mounted to the adaptor plate 200.

Figure 5A:
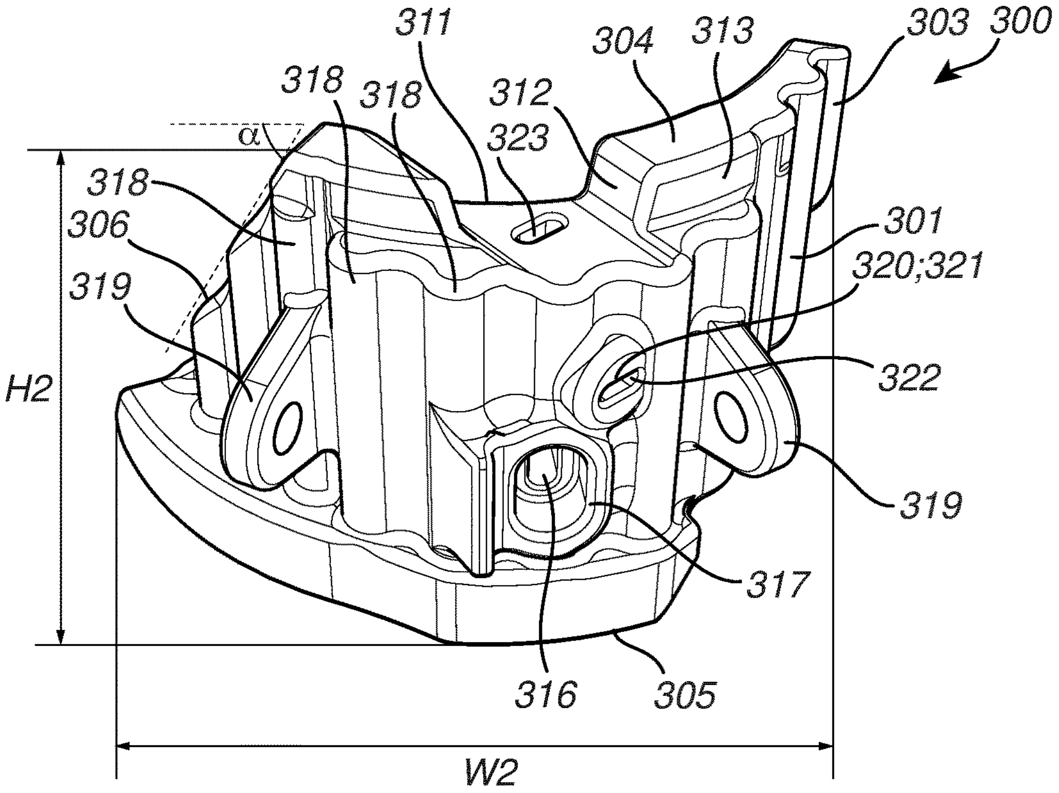
FIGS. 5*a* and 5*b* are two perspective views of a wear segment.
Figure 5B:
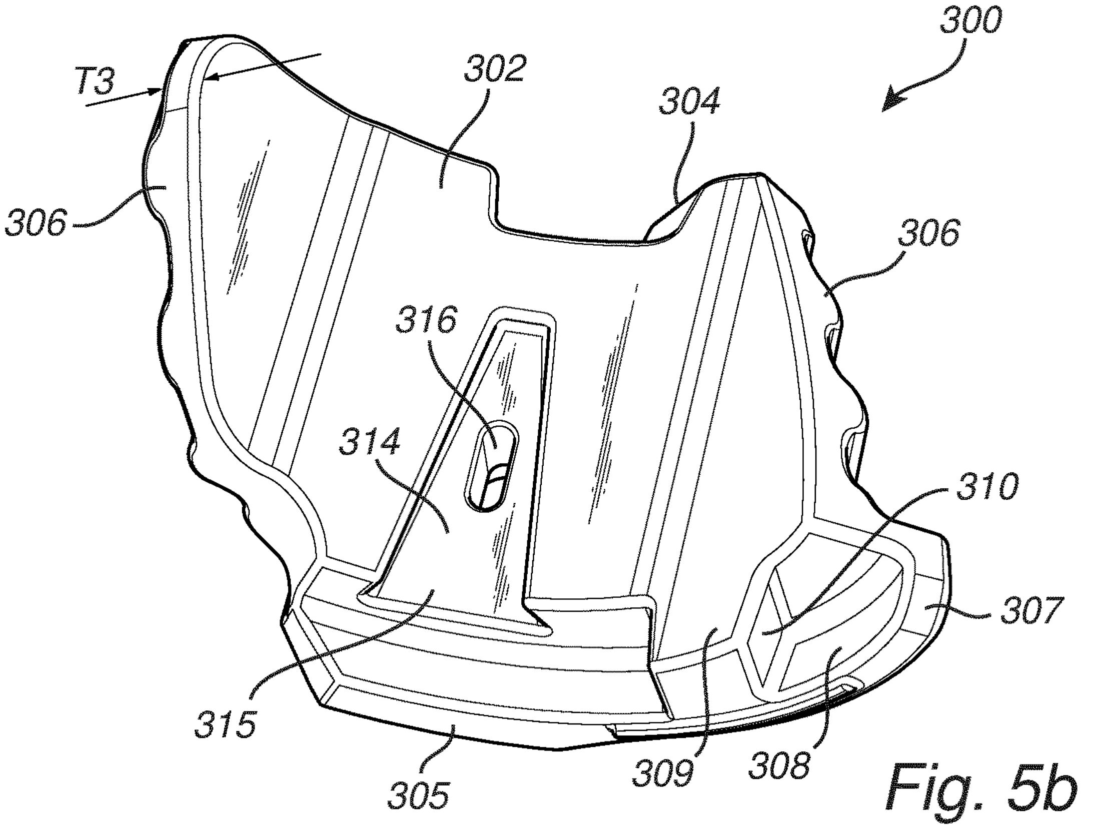

Now turning to FIGS. 5*a* and 5*b*, two perspective views of one embodiment of the wear segment 300 is disclosed. FIG. 5*a* discloses the exterior envelope surface 301 which during use is configured to face away from the shaft 100.

FIG. 5*b* discloses the inner envelope surface 302 which during use is configured to face the shaft 100 and lockingly engage the adaptor plate 200.

The wear segment 300 may e.g. be made of a steel having a high wear resistance, such as high chromium white iron. Rubber or PU (Polyurethane) may be used as an alternative to steel. The wear segment 300 may be formed by casting.

The wear segment 300 is formed as a unitary body 303 having a single curved extension complementary to that of the adaptor plate 200. The wear segment 300 has a longitudinal extension, i.e. a height H2 that corresponds to substantially half the pitch of the helical screw flight 101 and/or half the height H1 of the adaptor plate 200. Further, the wear segment 300 has a width W2 that is adapted so that the full circumference of the free surface of the shaft 100 may be covered by wear segments 300 in a condition when a plurality of wear segments 300 are arranged one after the other in an abutting or partially overlapping relationship along the longitudinal extension L of the shaft 100. The purpose of providing an abutting or partially overlapping relationship is to allow a longitudinally extending sealed wear surface to be formed along the shaft 100 as is disclosed in FIG. 2. To allow this kind of stacking, an upper edge portion 304 of the wear segment 300 is provided with a profile that is configured to fit the profile of a lower edge portion 305 of the wear segment 300. Thus, when stacking one wear segment 300 on top of another wear segment 300 along the longitudinal extension L of the shaft 100, the upper edge portion 304 of a first wear segment 300 will fit the lower edge portion 305 of a subsequent wear segment 300. This may be either in an abutting relationship or in an overlapping relationship.

The side walls 306 interconnecting the upper and lower edge portions 304, 305 are arranged with an angle α corresponding to the pitch of the helical screw flight 101.

The lower edge portion 305, best seen in FIG. 5*b*, comprises a longitudinally extending flange 307 having an inner envelope surface 308. The inner envelope surface 308 is provided with a shoulder 309. The shoulder 309 is provided with a slanting longitudinally extending guiding surface 310. The upper edge portion 304, best seen in FIG. 5*a*, comprises a longitudinally extending recess 311. The recess 311 comprises a slanting longitudinally extending guiding surface 312 which is complementary to the guiding surface 310 of the lower edge portion 305. In a position when two wear segments 300 are arranged one on top of the other, the guiding surface 312 of the upper wear segment will abut the guiding surface 310 of the lower segment. The slanting will facilitate a guiding effect as the upper wear segment is lowered onto the lower wear segment during mounting of a wear segment 300 to the shaft. Further, the inner envelope surface 308 of the flange 307 will abut an outer envelope portion 313 of the upper edge portion 307 of such upper wear segment in a longitudinally overlapping relationship, thereby providing a sealed interface between two wear segments which are arranged one above the other along the longitudinal extension L of the shaft 100.

As is best seen in FIG. 5*b*, the inner envelope surface 302 of the wear segment 300 comprises a locking member, in the following referred to as the second locking member 314. The second locking member 314 is formed as a wedge-shaped recess with a downwardly open mouth 315. The second locking member 314 has a geometry being complementary to the at least one first locking member 204 which is part of the adaptor plate 200. The at least one first and second locking members 204, 314 are configured to lockingly engage each other by a sliding movement where the truncated end of the first locking member 204 forming an insertion end 209 is longitudinally inserted into the open mouth 315 of the second locking member.

To allow a fixation of the wear element 300 to the adaptor plate 200 in its mounted position, the body 303 of the wear segment 300 is provided with a through-going hole 316 configured to receive a non-disclosed bolt. The bolt is configured to engage, e.g. by threading the mating hole 211 in the first locking member 204 of the adaptor plate 200. To allow dimensional tolerances relating to the relative displacement between the wear segment 300 and the adaptor plate 200, it is preferred that the through-going hole 316 is arranged as a long hole. To accommodate and protect the bolt head from wear, the through-going hole 316 may be partially recessed in the exterior envelope surface 301 of the wear segment 300. Further, it is preferred that the exterior envelope surface 301 of the wear segment 300 in an area around the through-going hole 316 is provided in an area having a locally enlarged thickness of material. To further protect the bolt and its bolt head, the area of the exterior envelope surface 301 adjacent the through-going hole 316 may be provided with a protective wall portion 317. The protective wall portion 317 must not have a circumferential extension as such, but it is sufficient that such protective wall portion 317 has an extension facing a leading edge of the lining element 102 of the helical screw flight 101 as seen during rotation of the agitator.

As is best seen in FIG. 5*a*, the exterior envelope surface 301 comprises a plurality of undulations 318. The undulations 318 have an extension substantially coinciding with the main moving direction of the material to be ground in the chamber of the vertical grinding mill. The undulations 318 may have an extension coinciding with the longitudinal extension L of the shaft 100 as seen in a condition when the at least one wear segment 300 is mounted thereto. The undulations 318 serve as wear material, i.e. material to be abraded during operation to thereby increase the operational life length of the wear segments 300. By providing the wear material in the form of undulations 318 having a locally increased thickness of material, the overall weight of the individual wear segment 300 may be decreased. It is accordingly to be understood that the number of undulations 318, their position and geometry may be changed within the scope of the invention with remained function.

The exterior envelope surface of the wear segment 300 further comprises two lifting lugs 319. It is to be understood that it suffices with one lifting lug only. The lifting lug 319 may be used to facilitate handling of the wear segment 300 during the act of mounting the wear segment 300 to the adaptor plate 200. The lifting lug 319 may be formed unitary with the wear segment 300 as is disclosed. Alternatively, the lifting lug 319 may be provided as a separate member to be attached to the wear segment 300. The lifting lug 319 is designed as a protruding ear which will be either worn down or break off during operation.

The wear segment 300 comprises an optional eyelet 320. The eyelet 320 is configured to receive a non-disclosed lifting strap which may be used to remove a worn wear segment 300 during maintenance or replacement. The eyelet 320 is embodied as a through going channel 321 having an extension between an inlet 322 arranged in the exterior envelope surface and an outlet 323 arranged in the upper edge portion 304. The outlet 323 is in the disclosed embodiment arranged in the upper edge portion 304 where it is substantially protected from wear by the help of the lower edge portion 305 of an abutting or partially overlapping subsequent wear segment 300.

It is preferred that the eyelet 320 is positioned so that the wear segment 300 may be lifted in parallel with the longitudinal extension L of the shaft 100 and hence in parallel with the longitudinal extension of the first and second locking members 204, 314 respectively. It is preferred that at least one of the inlet 322 and the outlet 323 is arranged in a surface which have an extension different from the thickness direction T3 of the wear segment 300. Further, it is preferred that the eyelet 320 is arranged in a portion of the exterior envelope surface 301 which has a locally increased thickness of material. Thereby, the channel 321 forming the eyelet 320 will remain unaffected also when the wear segment 300 has been worn to such extent that it is ready to be removed.

Figure 6:
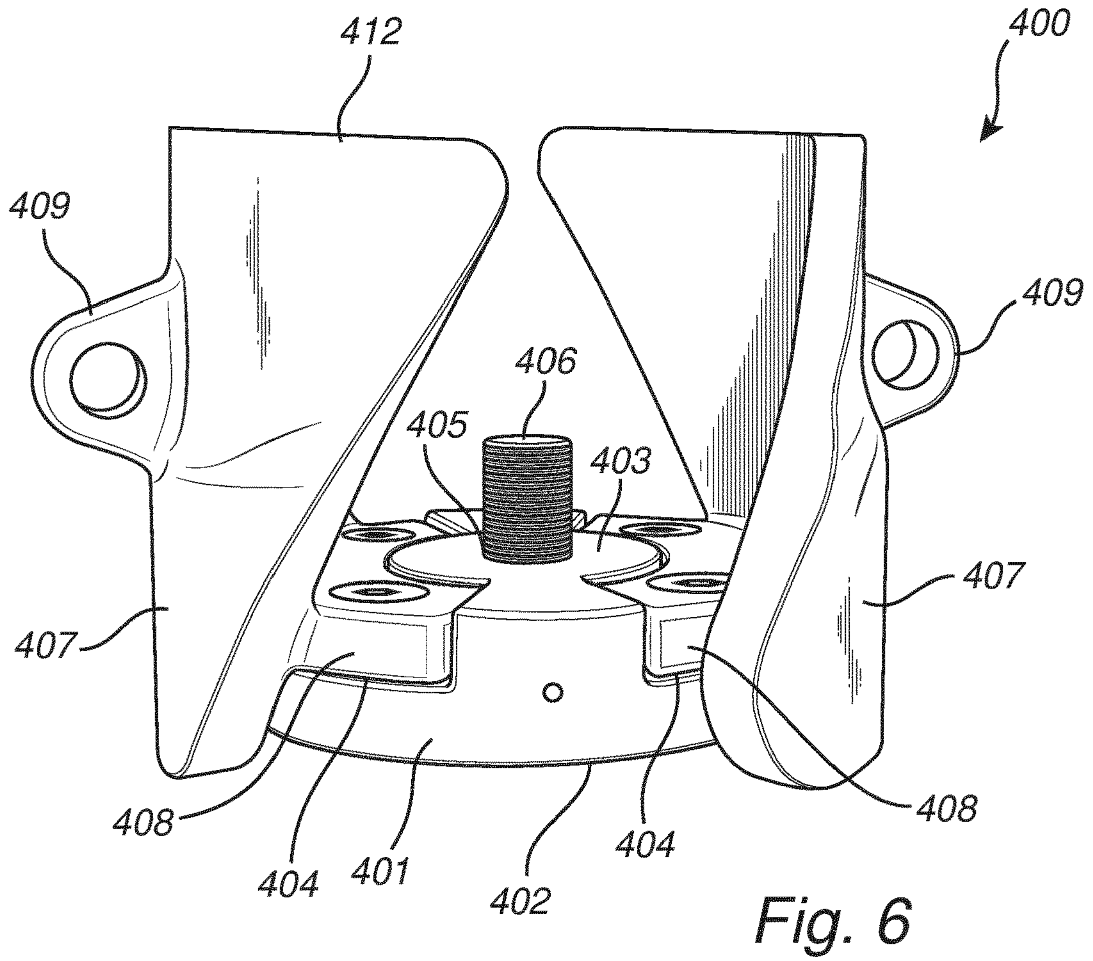
FIG. 6 is a first embodiment of an end-cap.

Now turning to FIG. 6 one embodiment of the end-cap 400 is disclosed.

The end-cap 400 comprises a circular steel plate 401 having a lower, substantially flat surface 402 and an upper surface 403. The upper surface 403 is provided with two opposing radially extending recesses 404. Further, the circular steel plate 401 comprises a through-going central hole 405 configured to receive a bolt 406 which is used to bolt the end-cap 400 to the lower most free end of the shaft 100.

The end-cap 400 further comprises two single-curved liners 407 having a curvature corresponding to the curvature of the free end of the shaft 100. Each liner 407 comprises, on an inner envelope surface thereof, a radially extending flange 408. The two liners 407 are configured to be fixedly mounted to the circular steel plate 401 with the flanges 408 being received in the radially extending recesses 404 of the circular steel plate 401. The resulting end-cap 400 is configured to be bolted to the free end of the shaft 100 by the bolt 406. The liners 407 comprises a respective lifting lug 409 configured to facilitate handling during mounting or replacement. The liners 407 constitute the primary wear part and will by this embodiment be easily replaceable when worn.

Figure 7:
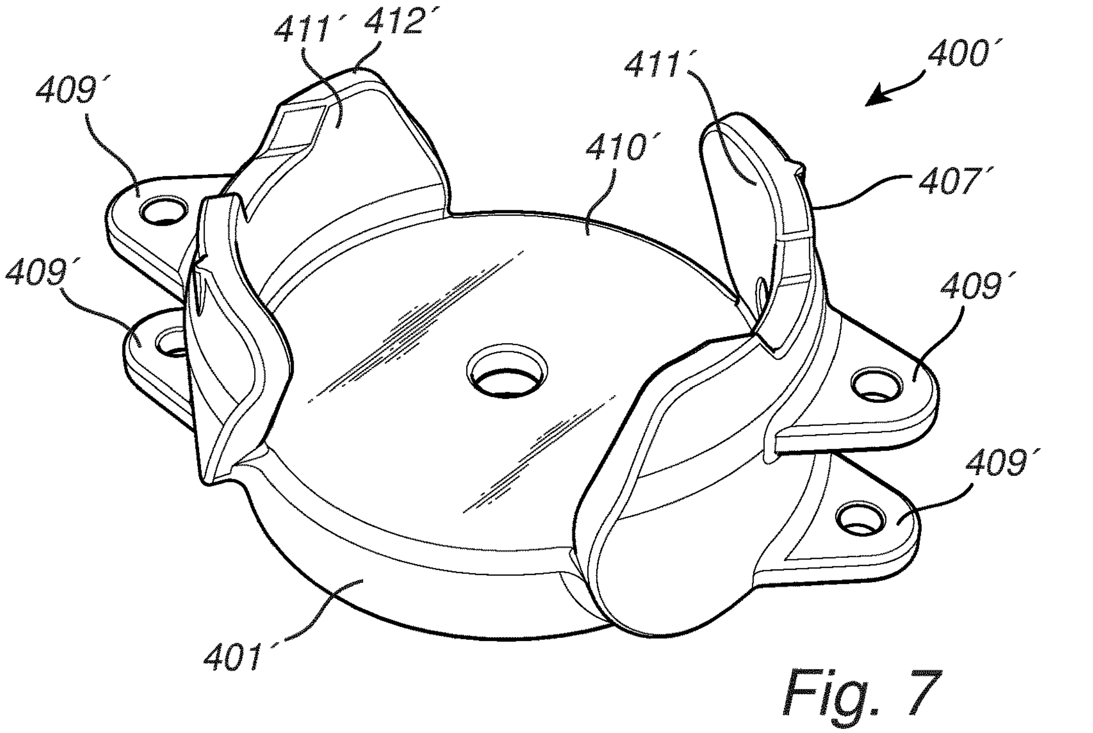
FIG. 7 is a second embodiment of an end-cap.

It is to be understood that the end-cap 400 may be formed in a number of ways. An alternative embodiment of an end-cap 400' is disclosed in FIG. 7. The end-cap 400' is formed as a unitary body 410' with a bottom wall 401' having an extension transverse to the longitudinal extension L of the shaft 100 and two opposing side wall portions 411' forming a liner 407' configured to longitudinally abut a lower most longitudinally extending side wall portion of the shaft 100. The side wall portions 411' comprise lifting lugs 409' configured to facilitate handling during mounting or replacement. In this embodiment, the complete end-cap 400' is to be replaced when worn.

No matter design, the end-cap 400, 400' should be made of a wear resistant material. The material may be of the same type as that used for the wear segments, i.e. a steel having a high wear resistance, such as high chromium white iron.

No matter design of the end-cap 400, 400', an upper most free edge portion 412, 412' of its longitudinally extending liner 407, 407' is intended to form an abutment surface for a lower most wear segment 300 in a plurality of wear elements being arranged one after the other to thereby form a longitudinally extending sealed wear surface along the shaft 100.

Figure 8:
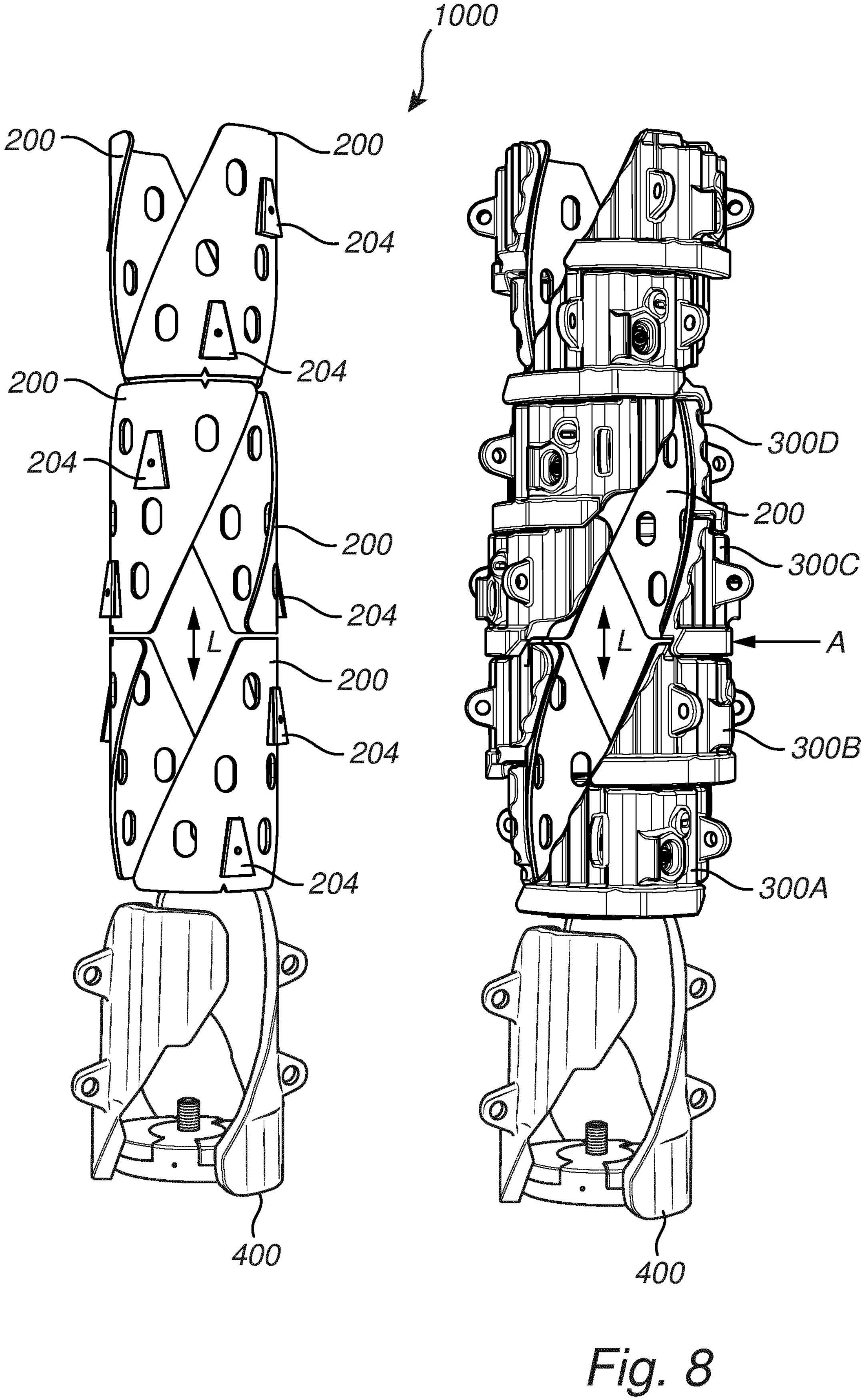
FIG. 8 discloses an overview of the inventive system in a partially and fully assembled condition with the omission of the shaft and its helical screw flight.
Figure 9:
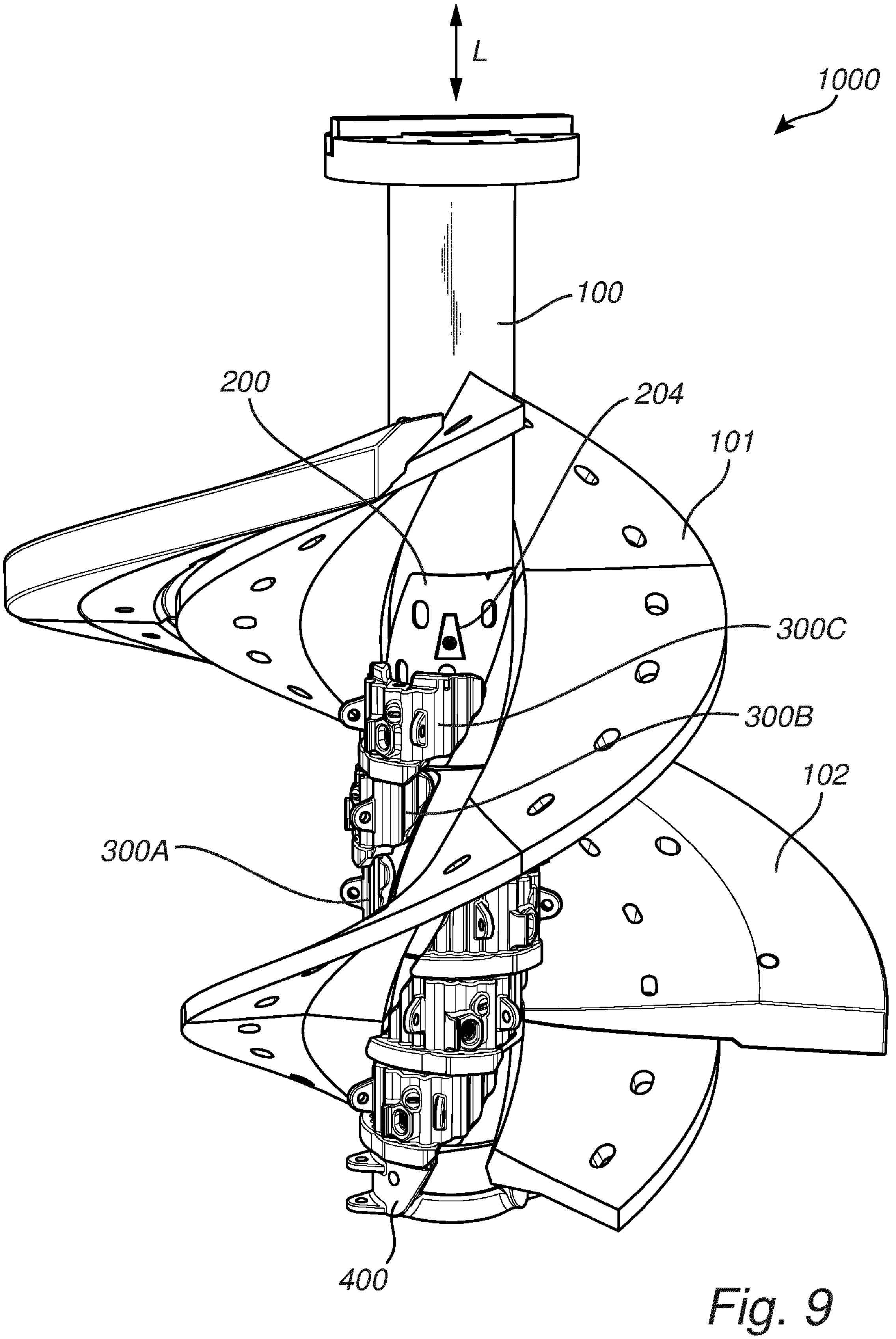
FIG. 9 discloses an overview of the inventive system in a partially assembled condition with the shaft and its helical screw flight.

Now turning to FIGS. 8 and 9, one embodiment of a mounted system 1000 is disclosed. To facilitate understanding, the shaft 100 with its a helical screw flight 101 and lining element 102 has been omitted in FIG. 8. The left-hand side of FIG. 8 discloses the system 1000 before mounting the wear segments, and the right-hand side discloses the system after mounting the wear segments 300.

Starting from below, the system 1000 comprises an end-cap 400. Four adaptor plates 200 are arranged longitudinally above the end-cap 400 and in a helical pattern around the shaft 100. The helical pattern thereby defines a helical interspace configured to accommodate the helical screw flight 101, see FIG. 9.

Each adaptor plate 200 comprises two locking members 204 and is hence configured to support two wear segments 300A, 300B; 300C, 300D each. The two locking members 204 of each adaptor plate 200 are displaced in view of each other in the circumferential direction so that the two wear segments 300A, 300B; 300C, 300D may engage each other in an abutting and/or partially overlapping relationship to thereby follow the helical pattern, see arrow A in FIG. 8. Further, two subsequent adaptor plates 300 are longitudinally displaced in view of each other along the longitudinal extension L of the shaft 100 so that the four wear segments 300A, 300B, 300C, 300D together form a continuous sealed wear surface along the longitudinal extension L of the shaft 100 and along the pitch of the helical screw flight 101. The resulting effect is that the full free surface of the shaft 100, see FIG. 9, will be protected from wear by the end-cap 400 and the plurality of wear segments 300A, 300B, 300C, 300D. Note that the upper most wear segment 300D is omitted in FIG. 9 to facilitate understanding.

Figure 10:
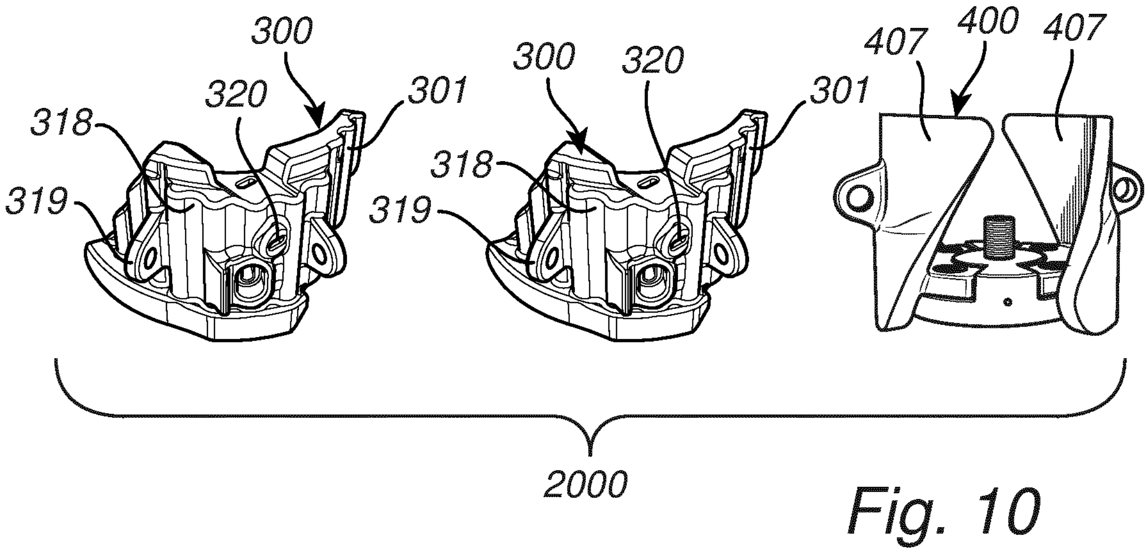
FIG. 10 discloses one embodiment of a replacement kit.

Now turning to FIG. 10, one embodiment of a replacement kit 2000 of wear segments 300 is disclosed. The replacement kit comprises at least two wear segments 300 of the type described above and may be provided as spare parts to be used during maintenance of the system for a vertical grinding mill which has been discussed above. The design of the at least two wear segments 300 have been discussed above and to avoid undue repetition, reference is made to the previous discussion. It is to be understood that depending on the design of the shaft, the at least two wear segments may be arranged either directly or indirectly to the shaft. In the event of an indirect arrangement, the at last two wear segments may be configured to be mounted to adaptor plates mounted to the shaft. Each of the at least two wear segments 300 in the replacement kit 2000 may comprise at least one of: a second locking member 314 (not disclosed) having a geometry complementary to a first locking member 204 arranged directly or indirectly on the shaft; undulations 318 arranged on the exterior envelope surface 301 configured to face away from the shaft 100; at least one lifting lug 319; and at least one eyelet 320 configured to receive a lifting strap. The replacement kit 2000 may also comprise an optional end-cap 400 or liners 407 forming parts thereof configured to be mounted to a lower most free end of the shaft 100.

Figure 11:
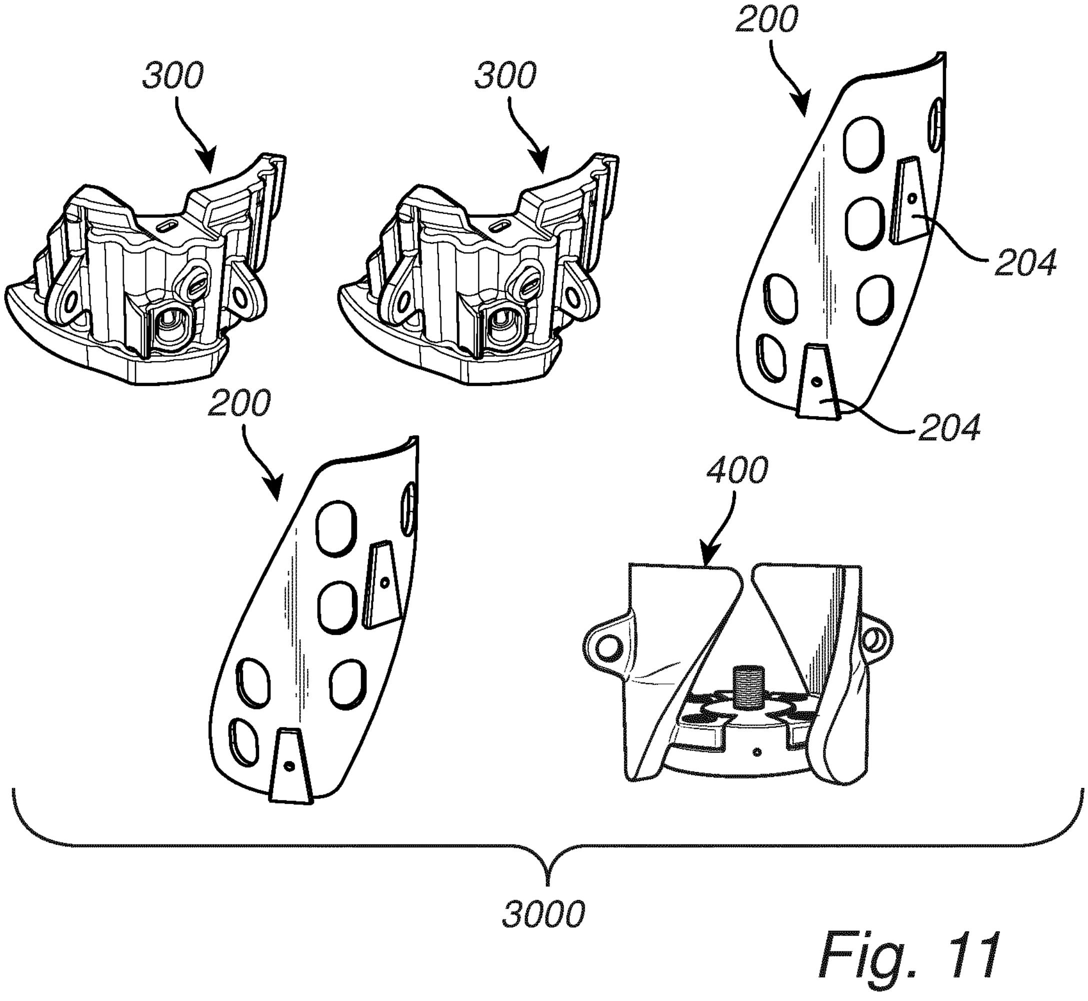
FIG. 11 discloses one embodiment of a kit of wear protection elements.

Now turning to FIG. 11, one embodiment of a kit 3000 of wear protecting elements is disclosed. The kit 3000 of wear protecting elements comprises at least two adaptor plates 200 being configured to be fixedly mounted to the shaft, and at least two wear segments 300 configured to be mounted to the adaptor plates 200. The at least two wear segments 300 and the at least two adaptor plates 200 comprise complementary first and second locking members of the type described above. Only the first type locking member 204 is shown. The kit 3000 may further comprise an end-cap 400 configured to be mounted to a lower most free end of the shaft. Accordingly, the kit 3000 comprises wear protection elements allowing a shaft of a grinding mill to be provided with a wear system no matter if it is installation of a brand-new shaft of an agitator or a retro-fit on an existing shaft. The advantages and design of the parts have been discussed above and to avoid undue repetition, reference is made to the previous discussion.

To get an overall idea of the size of the kit 3000 of wear protecting elements system, the following non-binding example is given of one single embodiment to be used in a mid-size agitator. In this specific embodiment, a single liner 407 of the end-cap has a weight of about 90 kg, a single wear segment 300 has a weight of about 70 kg and a single adaptor plate 200 has a weight of about 22 kg. Accordingly, a kit 3000 of wear protecting elements system with four adaptor plates 200, eight wear segments 300 and two liners 407 has a weight of at least 828 kg, excluding the bottom plate of the end-cap 400.

Figure 12:
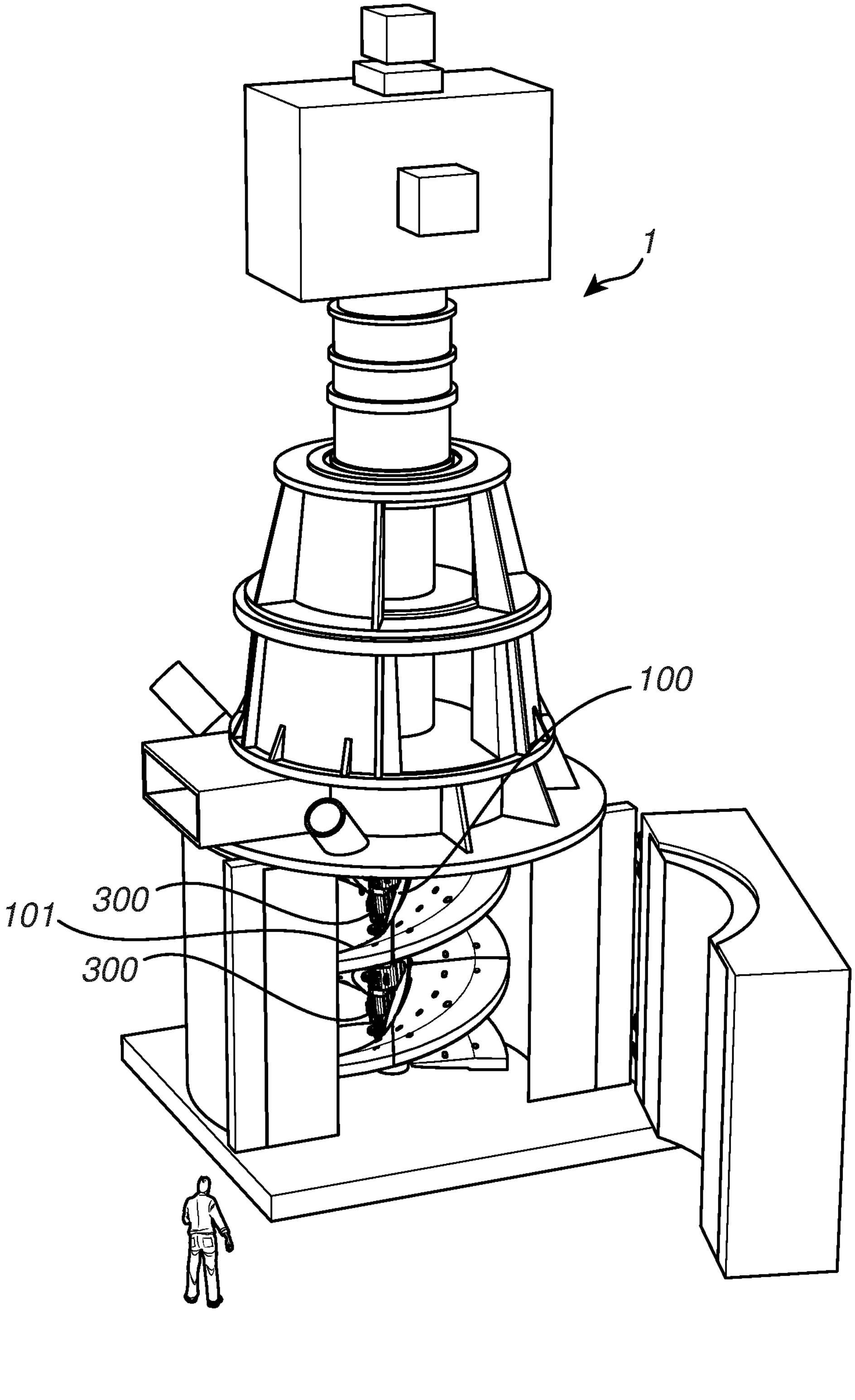
FIG. 12 discloses, highly schematically, one example of a vertical grinding mill provided with the inventive system.

Now turning to FIG. 12, one example of a vertical grinding mill 1 is disclosed in which the inventive system is used. The vertical grinding mill 1 comprises a longitudinally extending shaft 100 which supports a helical screw flight 101. The shaft 100 is provided with a wear protection in the form of a plurality of wear segments 300 which are arranged one after the other long the longitudinal extension of the shaft 100. The individual wear segments 300 are supported by adaptor plates by means of locking elements. The adaptor plates and the locking elements are arranged in the interface between the wear segments 300 and the shaft 100 and are hence not shown from the exterior. The wear segments 300, adaptor plates and locking elements are of the very same type as disclosed above and are hence not further discussed.

The skilled person realises that a number of modifications of the embodiments described herein are possible without departing from the scope of the disclosure, which is defined in the appended claims.

For instance, the first and second locking members 204, 314 may have other geometries than a wedge shape.

The first locking member 204 may be formed as a recess, whereas the second locking member 314 may be formed as a complementary wedge.

The pattern with undulations 318 of the wear segments 300 may be provided in a number of ways. Thus, the skilled person realizes that other patterns may be used with remained effect, i.e. with the purpose of providing a sufficient bulk of wear material while saving weight.

The adaptor plate 200 has been disclosed as being configured to support two wear segments 300. It is to be understood that each adaptor plate 200, within the scope of the invention, may be configured to support one wear segment 300 only. In such non-disclosed embodiment, the height of the adaptor plate may be half of the height H1 of the disclosed adaptor plate 200.

Below different items of the application is disclosed:

Item 1. A system (1000) for a vertical grinding mill, the system comprising a longitudinally extending shaft (100) supporting a helical screw flight (101), at least one adaptor plate (200) enabled to be fixedly mounted to the shaft (100), each adaptor plate (200) comprising at least one first locking member (204), and at least one wear segment (300) enabled to be supported by the at least one first locking member (204).

Item 2. The system according to item 1, wherein the at least one adaptor plate (200) is enabled to be fixedly mounted to the shaft (100) in an interspace between two longitudinally aligned portions of the helical screw flight (101).

Item 3. The system according to item 1 or item 2, wherein the at least one wear segment (300) comprises a second locking member (314) having a geometry complementary to the at least one first locking member (204), and wherein the at least one first and second locking members (204; 314) are enabled to lockingly engage each other by a sliding movement.

Item 4. The system according to item 3, wherein the at least one wear segment (300) is enabled to be fastened to the at least one adaptor plate (200).

Item 5. The system according to any of the preceding items, wherein the at least two wear segments (300) are enabled to be arranged one after the other as seen along the longitudinal extension of the shaft (100) in an abutting relationship and/or in a partly overlapping relationship.

Item 6. The system according to any of the preceding items, wherein a plurality of wear segments (300) are enabled to be installed along substantially the full longitudinal extension of the helical screw flight (101).

Item 7. The system according to any of the preceding items, wherein the at least one adaptor plate (200) is enabled to be fixedly mounted to the shaft (100) by welding.

Item 8. The system according to any of the preceding items, wherein the at least one wear segment (300) on an exterior envelope surface (301) thereof which is enabled to face away from the shaft (100) comprises undulations (318).

Item 9. The system according to any of the preceding items, wherein the at least one wear segment (300) on an exterior envelope surface (301) thereof which is enabled to face away from the shaft (100) comprises at least one lifting lug (319).

Item 10. The system according to any of the preceding items, wherein the at least one wear segment (300) comprises at least one eyelet (320) enabled to receive a lifting strap.

Item 11. The system according to any of the preceding items, wherein the at least one first locking member (204) is wedge (208), and wherein the at least one second locking member (314) is a recess, whereby the first and second locking members (204; 314) are enabled to interlock by a sliding movement.

Item 12. The system according to any of the preceding items, further comprising an end-cap (400; 400') enabled to be mounted to a lower most free end of the shaft (100).

Item 13. A replacement kit (2000) of wear segments for a longitudinally extending shaft (100) supporting a helical screw flight (101), the replacement kit (2000) comprising at least two wear segments (300) enabled to be directly or indirectly supported by the shaft (100), wherein the at least two wear segments (300) are enabled to be arranged one after the other as seen along the longitudinal extension of the shaft (100) in an abutting relationship and/or in a partly overlapping relationship.

Item 14. The replacement kit according to item 13, wherein each of the at least two wear segments (300) comprises at least one of:

a locking member (314) having a geometry complementary to a locking member (204) arranged directly or indirectly on the shaft (100);

undulations (318) arranged on an exterior envelope surface (301) enabled to face away from the shaft (100);

at least one lifting lug (319);

at least one eyelet (320) enabled to receive a lifting strap; and wherein the replacement kit (2000) further comprises an end-cap (400; 400') or a liner (407) thereof enabled to be mounted to a lower most free end of the shaft (100).

Item 15. A kit of wear protection elements (3000) for a longitudinally extending shaft (100) supporting a helical screw flight (101), the kit of wear protection elements (3000) comprising:

at least two adaptor plates (200) being enabled to be fixedly mounted to the shaft (100); and at least two wear segments (300) enabled to be mounted to the adaptor plates (200) one after the other as seen along the longitudinal extension of the shaft (100) in an abutting relationship and/or in a partly overlapping relationship; and wherein the at least two wear segments (300) and the at least two adaptor plates (200) comprise complementary locking members (204; 314).

Item 16. A vertical grinding mill (1), the vertical grinding mill (1) comprising a longitudinally extending shaft (100) supporting a helical screw flight (101), at least one adaptor plate (200) enabled to be fixedly mounted to the shaft (100), each adaptor plate (200) comprising at least one first locking member (204), and at least one wear segment (300) enabled to be supported by the at least one first locking member (204).

The invention claimed is:

1. A system for a vertical grinding mill, the system comprising:

a longitudinally extending shaft supporting a helical screw flight, a plurality of adaptor plates configured to be fixedly mounted to the shaft, each adaptor plate including at least one first locking member; and a plurality of wear segments, each of the plurality of wear segments including a second locking member, wherein the second locking member of each of the plurality of wear segments is configured to engage the first locking member of one of the plurality of adapter plates such that the plurality of wear segments are supported by the plurality of adapter plates, wherein the plurality of wear segments are configured to be arranged adjacent to each other as seen along the longitudinal extension of the shaft in an abutting relationship and/or in a partly overlapping relationship.

2. The system according to claim 1, wherein the plurality of adapter plates are each configured to be fixedly mounted to the shaft in an interspace between two longitudinally aligned portions of the helical screw flight.

3. The system according to claim 1, wherein the second locking members have a geometry complementary to the first locking members, and wherein the first and second locking members are configured to lockingly engage each other by a sliding movement.

4. The system according to claim 1, wherein each of the plurality of wear segments are configured to be fastened to one of the plurality of adaptor plates.

5. The system according to claim 1, wherein the plurality of wear segments are configured to be installed along substantially the full longitudinal extension of the helical screw flight.

6. The system according to claim 1, wherein the plurality of adaptor plates are each configured to be fixedly mounted to the shaft by welding.

7. The system according to claim 1, wherein the plurality of wear segments each include an exterior envelope surface that is configured to face away from the shaft and includes undulations.

8. The system according to claim 1, wherein the plurality of wear segments each include an exterior envelope surface that is configured to face away from the shaft and includes at least one lifting lug.

9. The system according to claim 1, wherein the plurality of wear segments each include at least one eyelet configured to receive a lifting strap.

10. The system according to claim 1, wherein each of the first locking members is a wedge, and wherein each of the second locking members is a recess, wherein the first and second locking members are configured to lockingly engage each other by a sliding movement.

11. The system according to claim 1, further comprising an end-cap configured to be mounted to a lower most free end of the shaft.

12. A replacement kit of wear segments for a longitudinally extending shaft supporting a helical screw flight and a plurality of adaptor plates each having a first locking member, the replacement kit comprising a plurality of wear segments each configured to be supported on the shaft by the plurality of adaptor plates, wherein the plurality of wear segments are configured to be arranged adjacent to each other as seen along the longitudinal extension of the shaft in an abutting relationship and/or in a partly overlapping relationship and wherein each of the plurality of wear segments comprises a second locking member having a geometry complementary to the first locking member on each of the plurality of adaptor plates on the shaft.

13. A kit of wear protection elements for a longitudinally extending shaft supporting a helical screw flight, the kit of wear protection elements comprising:

a plurality of adaptor plates being configured to be fixedly mounted to the shaft; and a plurality of wear segments, wherein the plurality of wear segments are configured to be mounted to the plurality of adaptor plates adjacent to each other as seen along the longitudinal extension of the shaft in an abutting relationship and/or in a partly overlapping relationship; and wherein the plurality of wear segments and the plurality of adaptor plates comprise complementary locking members.

14. A vertical grinding mill, the vertical grinding mill comprising:

a longitudinally extending shaft supporting a helical screw flight, a plurality of adaptor plates configured to be fixedly mounted to the shaft, wherein each of the plurality of adaptor plates includes at least one first locking member, and a plurality of wear segments configured to be supported by the first locking members of the plurality of adaptor plates, wherein the plurality of wear segments are configured to be arranged adjacent to each other as seen along the longitudinally extending shaft in an abutting relationship and/or in a partly overlapping relationship.

* * * * *